US012715629B2

(12) United States Patent
Vidhi et al.

(10) Patent No.: US 12,715,629 B2
(45) Date of Patent: Aug. 25, 2026

(54) AUTONOMOUS VEHICLE SYSTEM FOR WIND, SOLAR AND AGRICULTURAL FARMS

(71) Applicant: Inventus Holdings, LLC, Juno Beach, FL (US)

(72) Inventors: Rachana Vidhi, Palm Beach Gardens, FL (US); Eric D. Schwartz, Palm Beach Gardens, FL (US); Prasanna Shrivastava, Palm Beach Gardens, FL (US); Kyle A. Bush, Palm Beach Gardens, FL (US)

(73) Assignee: Inventus Holdings, LLC, Juno Beach, FL (US)

( * ) Notice: Subject to any disclaimer, the term of this patent is extended or adjusted under 35 U.S.C. 154(b) by 261 days.

(21) Appl. No.: 18/328,449

(22) Filed: Jun. 2, 2023

(65) Prior Publication Data

US 2024/0402706 A1 Dec. 5, 2024

(51) Int. Cl.
*B64U 70/93* (2023.01)
*B64D 1/02* (2006.01)
(Continued)

(52) U.S. Cl.
CPC ............... *B64U 70/93* (2023.01); *B64D 1/02* (2013.01); *B64U 50/37* (2023.01); (Continued)

(58) Field of Classification Search
CPC ........ G05D 1/0217; G05D 1/101; B64D 1/02; B64U 10/60; B64U 2101/40; B64U 2201/10
See application file for complete search history.

(56) References Cited

U.S. PATENT DOCUMENTS 9,139,310 B1 9/2015 Wang
10,239,613 B2 * 3/2019 Boyk .................... B64U 70/20
(Continued)

FOREIGN PATENT DOCUMENTS

CN 207932022 U 10/2018
CN 115185296 A 10/2022
(Continued)

OTHER PUBLICATIONS

Kim Bong Do, KR 20220075091 A_translation, Jun. 7, 2022 (Year: 2022).*

(Continued)

*Primary Examiner* — Erin D Bishop
*Assistant Examiner* — Shivam Sharma
(74) *Attorney, Agent, or Firm* — Fish & Richardson P.C.

(57) ABSTRACT

An autonomous vehicle control system of an autonomous vehicle system is described. The autonomous vehicle control system is configured to receive problem data characterizing a problem detected in a green energy generation system, wherein the problem data includes location data specifying a location of the problem. The autonomous vehicle control system is further configured to deploy the autonomous vehicle system to the location of the problem, the autonomous vehicle system including a rover and a drone docked with the rover in a docking bay, cause the rover to inspect the problem and determine one or more solutions for resolving the problem. The autonomous vehicle control system is further configured to select a solution from the one or more solutions for resolving the problem, wherein the selected solution has a lowest energy consumption among the one or more solutions and cause the autonomous vehicle system to execute the selected solution.

20 Claims, 9 Drawing Sheets

(51) Int. Cl.

| | |
|---|---|
| *B64U 50/37* | (2023.01) |
| *B64U 101/40* | (2023.01) |
| *B64U 101/45* | (2023.01) |
| *G05D 1/644* | (2024.01) |

(52) U.S. Cl.

CPC ...... *B64U 2101/40* (2023.01); *B64U 2101/45* (2023.01); *G05D 1/644* (2024.01)

(56) References Cited

U.S. PATENT DOCUMENTS

| | | | | |
|---|---|---|---|---|
| 10,453,348 | B2 | 10/2019 | Speasl et al. | |
| 11,034,449 | B2 * | 6/2021 | Bei | B64U 70/92 |
| 11,501,483 | B2 | 11/2022 | Speasl et al. | |
| 11,561,251 | B2 * | 1/2023 | Schwartz | G06N 3/045 |
| 11,738,866 | B1 * | 8/2023 | Rysdyk | G05D 1/042 701/18 |
| 2017/0030977 | A1 * | 2/2017 | Shon | G06Q 50/06 |
| 2017/0034983 | A1 * | 2/2017 | Couchman | A01B 63/002 |
| 2018/0016027 | A1 | 1/2018 | Cheatham, III et al. | |
| 2018/0072416 | A1 | 3/2018 | Cantrell et al. | |
| 2019/0359329 | A1 | 11/2019 | Gavrilov | |
| 2020/0130864 | A1 | 4/2020 | Brockers et al. | |
| 2021/0325910 | A1 | 10/2021 | Jones | |
| 2022/0024577 | A1 | 1/2022 | Stamatovski | |
| 2024/0320575 | A1 * | 9/2024 | Asadi | G06Q 10/06311 |

FOREIGN PATENT DOCUMENTS

| | | | | |
|---|---|---|---|---|
| EP | 3973759 | A1 | | 3/2022 |
| IN | 114944816 | A | | 8/2022 |
| KR | 20220075091 | A | * | 6/2022 |
| WO | WO-2019215756 | A1 | * | 11/2019 |

OTHER PUBLICATIONS

Shriram, WO-2019215756-A1_translation, Nov. 14, 2019 (Year: 2019).*

* cited by examiner

AUTONOMOUS VEHICLE SYSTEM FOR WIND, SOLAR AND AGRICULTURAL FARMS

TECHNICAL FIELD

This disclosure relates an autonomous vehicle system, in particular, to systems and methods for deploying the autonomous vehicle system for use in wind, solar and agricultural farms.

BACKGROUND

An unmanned aerial vehicle (UAV), commonly known as a drone, is an aircraft without any human pilot, crew, or passengers on board. An unmanned aerial vehicle (UAV) is a powered aerial vehicle that can fly autonomously or be piloted remotely. A UAV can also sometimes be used to carry materials/payload. Drones are typically powered by batteries. Though drones were initially used primarily for military applications, with the advancement in control technologies and the lowering of cost, the use of drones expanded to other areas like aerial photography, product deliveries etc.

An electric vehicle (EV) is a vehicle that uses one or more electric motors for propulsion. An EV can be powered with electricity from extravehicular sources, or the EV can be powered autonomously by a battery. A rover is an autonomous electric vehicle that is designed as an all-terrain vehicle and is capable of navigating to a destination on ground without human intervention with the help of control systems, sensors etc.

SUMMARY

One example relates to a non-transitory computer readable medium having stored thereon software instructions for an autonomous vehicle control system of an autonomous vehicle system. The software instructions, when executed by a processor core, cause the processor core to receive problem data characterizing a problem detected in a green energy generation system, wherein the problem data includes location data specifying a location of the problem. The software instructions further cause the processor core to deploy the autonomous vehicle system to the location of the problem, the autonomous vehicle system including a rover and a drone docked with the rover in a docking bay. Furthermore, the software instructions cause the processor core to cause the rover to inspect the problem responsive to the rover arriving at the location of the problem, determine solutions for resolving the problem responsive to the rover inspecting the problem and select a solution from the solutions for resolving the problem, wherein the selected solution has a lowest energy consumption among the determined solutions. In addition, the software instructions cause the processor core to cause the autonomous vehicle system to execute the selected solution.

Another example relates to a system for an autonomous vehicle system. The system includes a non-transitory memory having machine executable instructions, a processor core that accesses the memory and executes the machine executable instructions, the machine executable instructions including an autonomous vehicle control system for an autonomous vehicle system. The autonomous vehicle control system causes the processor core to execute operations including receiving problem data characterizing a problem detected in a green energy generator, wherein the problem data includes location data specifying a location of the problem and deploying the autonomous vehicle system to the location of the problem. The autonomous vehicle system includes a rover and a drone docked with the rover in a docking bay. The operations further include causing the rover to inspect the problem responsive to the rover arriving at the location of the problem, determining solutions for resolving the problem responsive to the rover inspecting the problem and selecting a solution from the solutions for resolving the problem, wherein the selected solution has a lowest energy consumption among the determined solutions. In addition, the operations include causing the autonomous vehicle system to execute the selected solution.

Yet another example relates to a method for an autonomous vehicle control system for an autonomous vehicle system. The method includes receiving, by the autonomous vehicle control system operating on a computing platform, problem data characterizing a problem detected in a green energy generator system, wherein the problem data includes location data specifying a location of the problem. The method further includes deploying, by the autonomous vehicle control system, the autonomous vehicle system to the location of the problem. The autonomous vehicle system includes a rover and a drone docked with the rover in a docking bay. Furthermore, the method includes causing, by the autonomous vehicle control system, the rover to inspect the problem responsive to the rover arriving at the location of the problem, determining, by the autonomous vehicle control system, solutions for resolving the problem responsive to the rover inspecting the problem and selecting, by the autonomous vehicle control system, a solution from the solutions for resolving the problem, wherein the selected solution has a lowest energy consumption among the determined solutions. In addition, the method includes causing, by the autonomous vehicle control system, the autonomous vehicle system to execute the selected solution.

DETAILED DESCRIPTION

This description relates to an autonomous vehicle control system (e.g., software) for an autonomous vehicle system that includes a combination of a rover (e.g., autonomous electric terrestrial all-terrain vehicle) and a drone (e.g., an unmanned ariel vehicle). The autonomous vehicle system is employed in the maintenance of solar farms, wind farms and/or agricultural farms. The autonomous vehicle control system is programmed to manage energy consumption of the autonomous vehicle system to increase a serviceable area without requiring an increase in a battery size/requirement for the drone or the rover.

The rover includes a docking station/bay for the drone. The rover also includes tools (e.g., actuators) for interacting with the environment. During intervals of time that the drone is docked in the docking station, a battery of the drone can be charged. In general, the drone requires more energy for deployment than the rover. Thus, the autonomous vehicle control system can selectively deploy the drone to execute tasks related to the maintenance of the solar farms, wind farms and/or agricultural farms in situations where the rover cannot execute the task by itself. Stated differently, to increase energy efficiency, the autonomous vehicle control system (e.g., the control software) can deploy the rover with the drone in the docking station to observe/inspect a detected problem (or other situation) in the solar farms, wind farms and/or agricultural farms, and autonomous vehicle control system can make a determination as to whether the detected problem can be resolved with operations of the rover alone.

If it is determined that the detected problem cannot be resolved with the rover alone or if it determined that the detected problem cannot be solved with the rover, the autonomous vehicle control system can cause the drone to launch from the docking station and resolve the problem. However, in situations where it is determined that the detected problem can be solved by the rover alone, the autonomous vehicle control system inhibits the launch of the drone from the docking station to curtail energy consumption. More generally, the autonomous vehicle control system deploys the rover with the docked drone to an area with a detected problem, and in response to the rover inspecting the problem, the autonomous vehicle control system selects and executes a lowest energy usage solution to correct/resolve the problem.

In this manner, battery usage is curtailed, as the launch of the drone is inhibited until after a determination is made that the rover cannot solve the problem by itself. Further, even in situations where the drone is launched, the autonomous vehicle system still has a net energy savings because the deployment of the drone (which has higher energy consumption than the rover) is delayed until the drone is in relatively close physical proximity with a detected problem.

Figure 1:
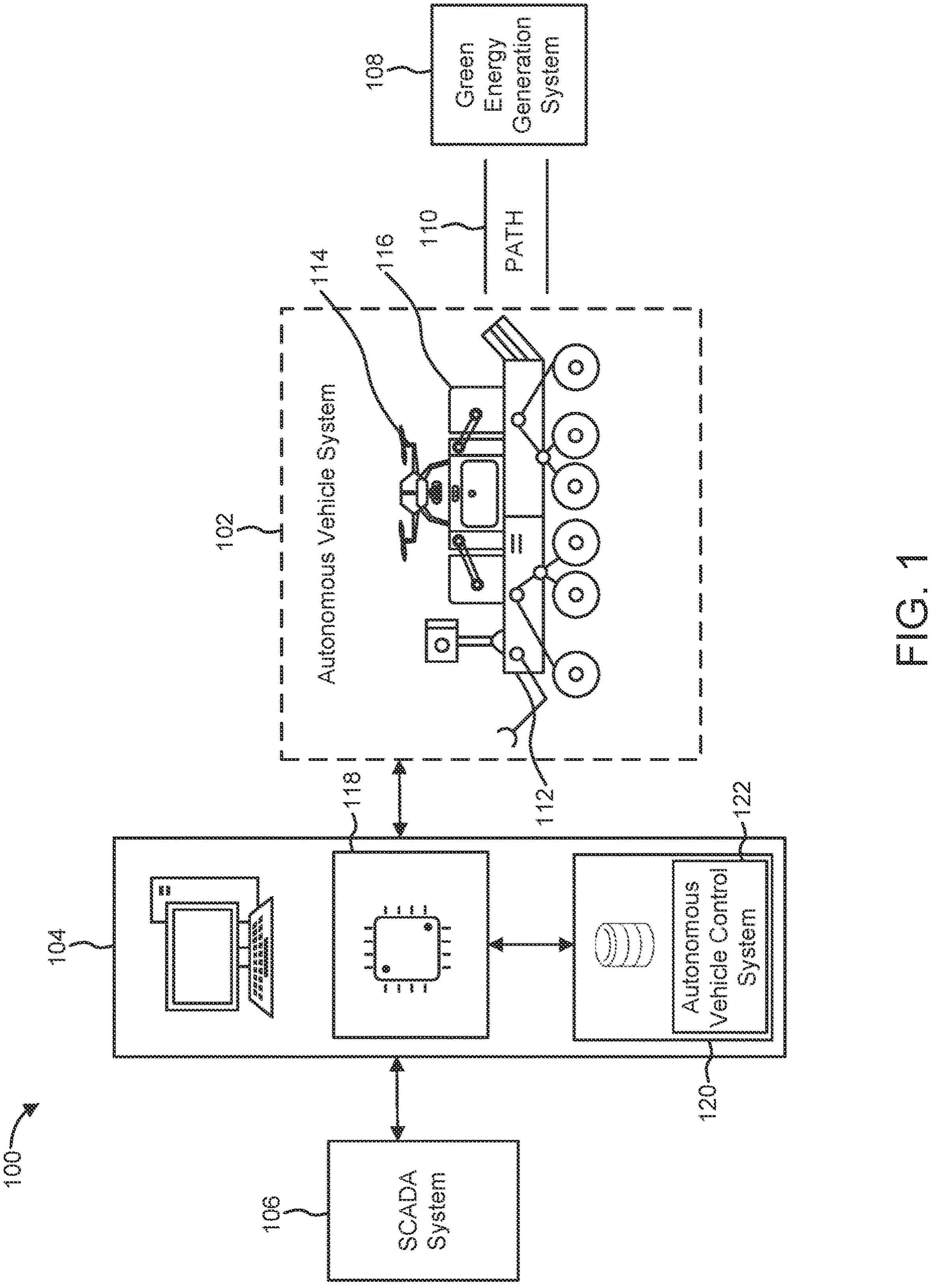
FIG. 1 illustrates an example system that is employed in the maintenance of solar farms, wind farms and/or agricultural farms.

FIG. 1 illustrates an example system 100 that is employed in the maintenance of solar farms, wind farms and/or agricultural farms. The system 100 includes an autonomous vehicle system 102, a computing system 104, a supervisory control and data acquisition (SCADA) system 106 and a green energy generation system 108. The autonomous vehicle system 102 includes a rover 112 and a drone 114 that can be docked with the rover 112 in a docking bay 116. The rover 112 includes an electric terrestrial all-terrain vehicle that is autonomous. In particular, the rover 112 includes an electric vehicle that is designed as an all-terrain vehicle and that can navigate on the ground autonomously without human intervention. The rover 112 includes sensors and other controls (including the autonomous vehicle control system 122) that facilitates the autonomous operation. The drone 114 includes an unmanned aerial vehicle. In particular, the drone 114 includes an aircraft that can operate autonomously without a human pilot on board. The drone 114 includes sensors (e.g., cameras, temperature sensors, etc.) and other controls (including the autonomous vehicle control system 122) that facilitates the autonomous operation. The docking bay 116 includes a docking station located on the rover 112 where the drone 114 can be docked. Both the rover 112 and the drone 114 are powered by batteries which can be charged/recharged. During the intervals of time when the drone 114 is docked with the rover 112 in the docking bay 116, the drone 114 (in particular, the battery of the drone 114) can be charged.

The green energy generation system 108 may include a green energy generator like a solar power plant/farm including one or more solar panels, a wind power plant/farm including one or more wind turbines etc. and/or an agricultural farm adjacent to the green energy generator. The computing system 104 is a computing platform which includes a processor core 118 and a memory 120. The memory 120 includes a non-transitory memory having machine executable (or software) instructions that includes the autonomous vehicle control system 122. The processor core 118 accesses the memory 120 and executes the machine executable instructions (or the autonomous vehicle control system 122). The computing system 104 may be implemented as part of the rover 112 or the drone 114, or both. Upon execution of the autonomous vehicle control system 122 by the processor core 118, the autonomous vehicle control system 122 causes the processor core 118 to execute operations for the maintenance of the green energy generation system 108 while managing the energy consumption of the autonomous vehicle system 102.

In particular, the autonomous vehicle control system 122 receives problem data characterizing a problem detected in the green energy generation system 108. In some examples, the problem data includes location data specifying a location of the problem. The problem data is received at the by the autonomous vehicle control system 122 from the SCADA system 106, in some examples. However, in other examples, the problem data may be received from other sources. The SCADA system 106 is configured to acquire data associated with the green energy generation system 108 and determine if there is a problem that needs to be addressed/resolved. In some examples, the problem may include issues with the green energy generator that needs to be fixed/resolved. However, in other examples, the problem may include tasks to be performed, for example, tilling and seeding the agricultural farm. Upon determining the problem, the SCADA system 108 is configured to provide the problem data that characterizes the problem and that specifies the location of the problem, to the autonomous vehicle control system 122.

In some examples, the problem data received at the autonomous vehicle control system 122 may include details of a problem associated with a solar panel(s) in the solar farm and a location of the solar panel(s) where the problem is detected. Further, in other examples, the problem data received at autonomous vehicle control system 122 may include details of a problem associated with a wind turbine(s) and a location of the wind turbine(s) where the problem is detected. Furthermore, in other examples, the problem data may include details of tasks to be performed on an agricultural farm adjacent to the green energy generator and a location of the agricultural farm (e.g., specific areas of the agricultural farm) where the tasks are to be performed.

Upon receiving the problem data, the autonomous vehicle control system 122 causes the processor core 118 to deploy the autonomous vehicle system 102 to the location of the problem. In particular, the autonomous vehicle system 102 is deployed to a close proximity of the green energy generation system (e.g., a solar panel, a wind turbine, the agricultural farm etc.) where the problem is detected via a path 110 depicting a distance. At this time, the drone 114 is docked with the rover 112 in the docking bay 116. In response to the rover 112 (with the drone 114 in the docked position) arriving at the location of the problem, the autonomous vehicle control system 122 causes the processor core 118 to cause the rover 112 to inspect the problem. During inspection, the rover 112 is configured to collect information/data related to the problem (via the use of cameras, sensors etc.) and provide such information/data to the autonomous vehicle control system 122. In response to the rover 112 inspecting the problem, the autonomous vehicle control system 122 causes the processor core 118 to determine one or more solutions for resolving the problem. Determining the one or more solutions by the autonomous vehicle control system 122 includes determining, based on the information/data collected by the rover 112, the various possibilities by which the problem can be resolved, for example, by the rover 112 alone, by both the rover 112 and the drone 114, or by deploying the drone 114 alone.

If the autonomous vehicle control system 122 determines that the problem can be resolved by the rover 112 alone, the solution includes deploying the rover 112 to resolve the problem and inhibiting a launch of the drone 114 from the docking bay 116. Alternately, if the autonomous vehicle control system 122 determines that the problem can be resolved by both the rover 112 and the drone 114, then the solution includes launching the drone 114 from the docking bay 116 and deploying the rover 112 and the drone 114 to resolve the problem. The drone 114, upon resolving the problem or attempting to resolve the problem, returns to the docked position in the docking bay 116. Further, if the autonomous vehicle control system 122 determines that the problem cannot be resolved by the rover 112, but only by the drone 114, then the solution includes launching the drone 114 from the docking bay 116 and deploying only the drone 114 to resolve the problem. The drone 114, upon resolving the problem or attempting to resolve the problem, returns to the docked position in the docking bay 116. In some examples, one or more of the above solutions may be available to resolve the problem.

For the solution involving deploying both the rover 112 and the drone 114, the rover 112 is deployed for a first interval of time and the drone 114 is deployed for a second interval of time. In some examples, the first interval of time terminates prior to the second interval of time. Alternately, in other examples, the second interval of time terminates prior to a start of the first interval of time. Further, in some examples, the first interval of time and the second interval of time overlap partially or fully. Furthermore, in some scenarios, the rover 112 and the drone 114 work in concert to resolve the problem. For the solution involving deploying both the rover 112 and the drone 114, in some examples, the drone 114 is tethered to the rover 112 by a physical connection, for example, by a hose. Alternately, in other examples, the drone 114 may be untethered from the rover 112. In examples where the drone 114 is tethered to the rover 112 by the physical connection, materials (such as de-icing solution, seeds, pesticides, water (for irrigation) etc.) are transferred from the rover 112 to the drone 114 through the physical connection, in response to deployment of the drone 114 to resolve the problem. Further, in some examples, the drone 114 is tethered to the rover 112 by the physical connection for a first interval of time and then the drone 114 is untethered from the rover 112 responsive to a determination that a distance the drone 114 has to travel to resolve the problem is greater than a length of the physical connection.

Upon determining the one or more solutions for resolving the problem, the autonomous vehicle control system 122 causes the processor core 118 to select a solution from the one or more solutions for resolving the problem. In some examples, the selected solution has a lowest energy consumption among the one or more solutions. The autonomous vehicle control system 122 causes the processor core 118 to calculate (or estimate) an energy usage (or battery usage) for the operations related to the one or more solutions, to determine the solution with the lowest energy consumption. In general, the drone 114 requires more energy than the rover 112 for deployment. More particularly, in a stationary position, the drone 114 consumes more energy to remain in the air. Therefore, in an example scenario, if the one or more solutions determined include a first solution where the rover 112 is deployed to resolve the problem and the launch of the drone 114 is inhibited, and a second solution, where both the rover 112 and the drone 114 are deployed to resolve the problem, then the autonomous vehicle control system 122 selects the first solution to resolve the problem, as the first solution has the lowest energy consumption among the first solution and the second solution.

Upon selecting the solution that has the lowest energy consumption, the autonomous vehicle control system 122 causes the processor core 118 to cause the autonomous vehicle system 102 to execute the selected solution. For example, if the selected solution includes deploying the rover 112 to resolve the problem and inhibiting a launch of the drone 114, the autonomous vehicle control system 122 causes the processor core 118 to deploy the rover 112 to resolve the problem and inhibit the launch of the drone 114.

In some examples, the problem data received at the autonomous vehicle control system 122 characterizes two or more problems detected in the green energy generation system 108. In such cases, the autonomous vehicle control system 122 causes the processor core 118 to cause the autonomous vehicle system 102 to resolve the two or more problems in a sequence based on assessing a battery capacity of the autonomous vehicle system 102. In particular, in one example, the problem data may include details of a first problem and a second problem associated with the green energy generation system 108. In such cases, the autonomous vehicle control system 122 causes the processor core 118 to cause the autonomous vehicle system 102 to execute a first solution for resolving the first problem and execute a second solution for resolving the second problem in a sequence based on assessing a battery capacity of the autonomous vehicle system 102. The first solution comprises a selected solution having a lowest energy consumption among one or more solutions for resolving the first problem and the second solution comprises a selected solution having a lowest energy consumption among one or more solutions for resolving the second problem. The procedure for determining/selecting the first solution and the second solution is same as explained above with regard to the scenario of the single problem and is therefore not repeated herein.

Upon receiving the problem data that includes the details of the first problem and the second problem, in one example, the autonomous vehicle control system 122 causes the processor core 118 to determine the first solution and cause the autonomous vehicle system 102 to execute the first solution responsive to a determination that the battery capacity is adequate to execute the first solution. Further, the autonomous vehicle control system 122 causes the processor core 118 to deploy the autonomous vehicle system 102 to a location of the second problem, determine the second solution and cause the autonomous vehicle system 102 to execute the second solution responsive to a determination that the battery capacity adequate to execute the second solution.

In another example, the autonomous vehicle control system 122 causes the processor core 118 to determine the first solution and cause the autonomous vehicle system 102 to execute the first solution responsive to a determination that the battery capacity is adequate to execute the first solution. Further, the autonomous vehicle control system 122 causes the processor core 118 to deploy the autonomous vehicle system 102 to a location of the second problem, determine the second solution, cause the autonomous vehicle system 102 to recharge responsive to a determination that the battery capacity is inadequate to execute the second solution Further, the autonomous vehicle control system 122 causes the processor core 118 to re-deploy the autonomous vehicle system 102 to resolve the second problem after the recharge. Recharging the autonomous vehicle system 102 may include recharging the rover 112 or the drone 114, or both. For example, in one scenario, when both the first solution and the second solution involve deploying the drone 114, the battery capacity of the drone 114 may be inadequate (considering the lower battery capacity of the drone 114) to execute the second solution since the drone 114 was already deployed to execute the first solution. In such scenarios, it is possible that the battery capacity of the rover 112 is adequate to execute the second solution. Therefore, in this scenario, only the drone 114 needs to be recharged to execute the second solution. The drone 114 may be recharged by docking the drone 114 in the docking bay 116 on the rover 112.

In yet another example, the autonomous vehicle control system 122 causes the processor core 118 to determine the first solution and deploy the autonomous vehicle system 102 to a location of the second problem responsive to a determination that the battery capacity is inadequate to execute the first solution. The autonomous vehicle control system 122 further causes the processor core 118 to determine the second solution, determine that the battery capacity is adequate to execute the second solution and cause the autonomous vehicle system 102 to execute the second solution. Upon executing the second solution, the autonomous vehicle control system 122 further causes the processor core 118 to cause the autonomous vehicle system 102 to recharge and re-deploy the autonomous vehicle system 102 to execute the first solution after the recharge. Executing multiple solutions in sequence based on the battery capacity, allows for an increased service area with the battery capacity that is available.

Figure 2:
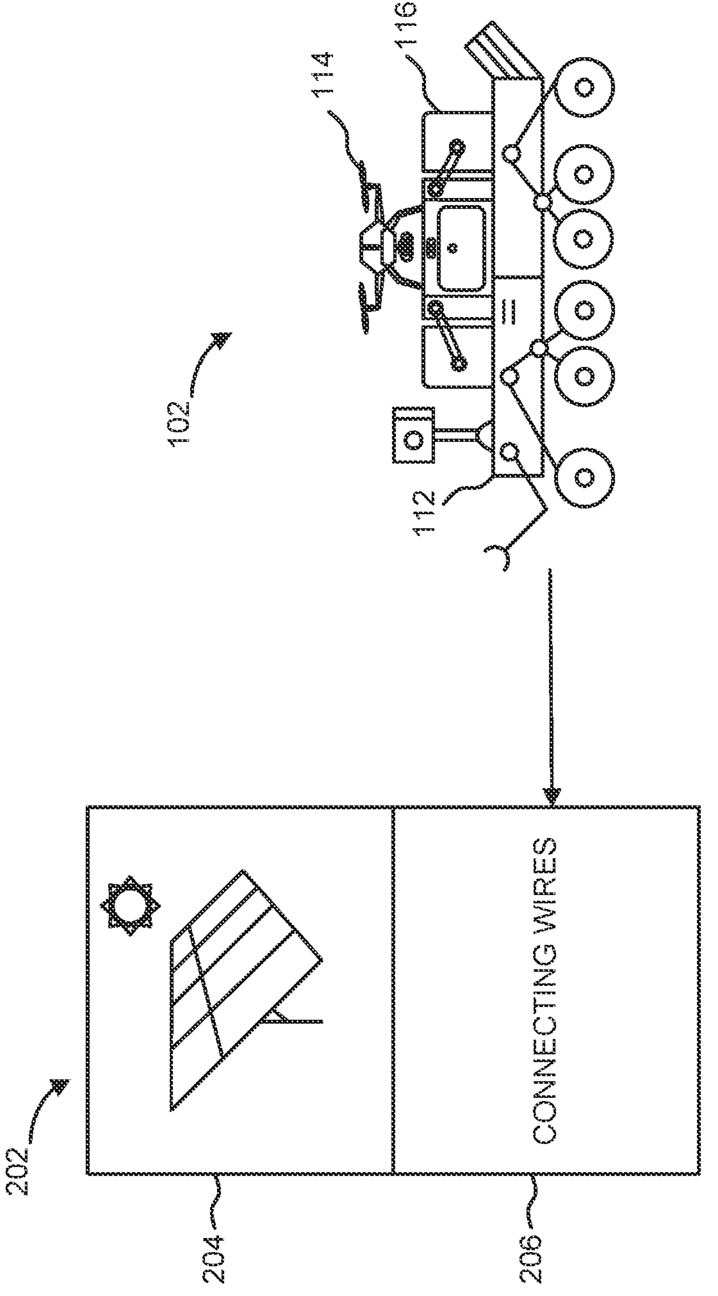
FIG. 2 illustrates a solution for resolving a problem in a solar power plant/farm using an autonomous vehicle system.

FIG. 2 illustrates a solution for resolving a problem in a solar power plant/farm 202 using an autonomous vehicle system 102. The solution described herein may include a solution as determined with respect to the system 100 in FIG. 1 and is therefore described herein with reference to the green energy generation system 108 in FIG. 1. The autonomous vehicle system 102 depicted in FIG. 2 is same as the autonomous vehicle system 102 in FIG. 1, and therefore, the same numbering is used herein. The solution depicted herein may include a selected solution (e.g., a solution with a lowest energy consumption) to resolve a problem associated with a solar panel 204 in the solar power plant/farm 202. In this example, the solar power plant/farm 202 is shown to include only a single solar panel 204 for the ease of reference. However, in other examples, the solar power plant/farm 202 can include multiple solar panels. The solar power plant/farm 202 is part of the green energy generation system 108 in FIG. 1.

In this example, the solution includes deploying the rover 112 to resolve the problem associated with the solar panel 204 and inhibiting a launch of the drone 114 from the docking bay 116. Therefore, in this example, the drone 114 is not deployed to resolve the problem. For example, if the problem includes a wiring problem associated with connective wires 206 of the solar panel 204, then the solution includes deploying the rover 112 (with the drone 114 in the docked position in the docking bay 116) to an underside of the solar panel to work on the connective wires 206 using actuators (e.g., robot hands), to resolve the problem. In other examples, the rover 112 can be deployed to resolve other kinds of problems associated with the solar panel 204 and is not limited to problems with the connective wires 206.

Figure 3:
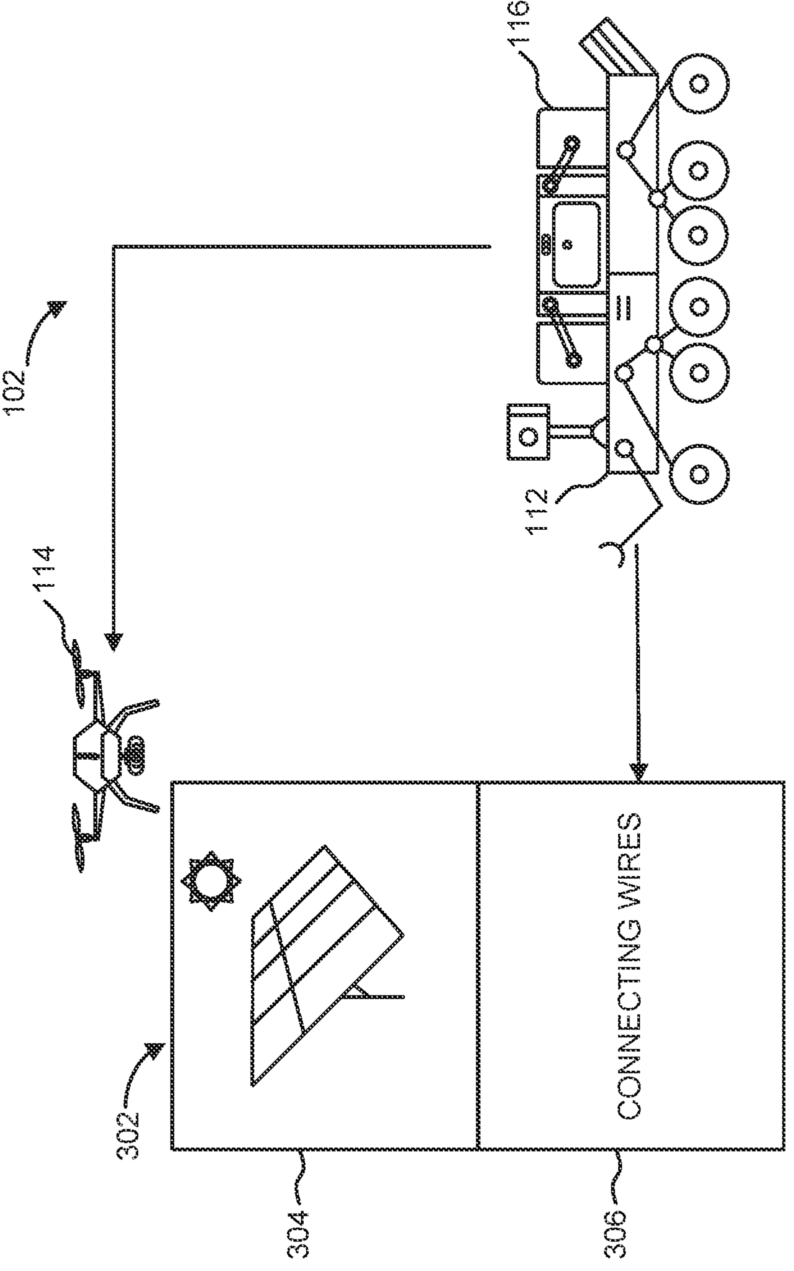
FIG. 3 illustrates another solution for resolving a problem in a solar power plant/farm using an autonomous vehicle system.

FIG. 3 illustrates another solution for resolving a problem in a solar power plant/farm 302 using an autonomous vehicle system 102. The solution described herein may include a solution as determined with respect to the system 100 in FIG. 1 and is therefore described herein with reference to the green energy generation system 108 in FIG. 1. The autonomous vehicle system 102 depicted in FIG. 3 is same as the autonomous vehicle system 102 in FIG. 1, and therefore, the same numbering is used herein. The solution depicted herein may include a selected solution (e.g., a solution with a lowest energy consumption) to resolve a problem associated with a solar panel 304 in the solar power plant/farm 302. In this example, the solar power plant/farm 302 is shown to include only a single solar panel 304 for the ease of reference. However, in other examples, the solar power plant/farm 302 can include one or more solar panels. The solar power plant/farm 302 is part of the green energy generation system 108 in FIG. 1.

In this example, the solution includes launching the drone 114 from the docking bay 116 and deploying the rover 112 and drone 114 to resolve the problem associated with the solar panel 304. The rover 112 is deployed for a first interval of time and the drone 114 is deployed for a second interval of time. In some examples, the first interval of time terminates prior to the second interval of time. Alternately, in other examples, the second interval of time terminates prior to the first interval of time. Further, in some examples, the first interval of time and the second interval of time overlap partially or fully. Furthermore, in some scenarios, the rover 112 and the drone 114 work in concert to resolve the problem. In some examples, the drone 114 is tethered to the rover 112 by a physical connection when the drone 114 is deployed to resolve the problem. During the deployment of the drone 114, in some examples, the drone 114 is selectively untethered from the rover 112 responsive to a determination that a distance the drone 114 has to travel to resolve the problem is greater than a length of the physical connection. Alternately, in other examples, the drone 114 is untethered from the rover 112 when the drone 114 is deployed to resolve the problem.

In one example, when the problem includes a wiring problem associated with connective wires 306 of the solar panel 304 and some issues on a top side of the solar panel 304, the solution includes deploying the rover 112 to the under side of the solar panel 304 to work on the connective wires 306 and deploying the drone 114 to the top side of the solar panel 304 to resolve the issues/problems associated with the top side of the solar panel 304. In another example, when the problem includes de-icing the solar panel 304, the solution includes deploying the rover 112 act as a reservoir to store the de-icing solution and pump the de-icing solution to the drone 114 and deploying the drone 114 to spray the de-icing solution on the solar panel 304.

In some examples, the drone 114 is tethered to the rover 112 by a hose (e.g., a physical connection) when the drone 114 is deployed to spray the de-icing solution and the rover 112 is configured to pump the de-icing solution to the drone 114 through the hose. Transferring the de-icing solution (or other materials) to the drone 114 in this manner curtails energy usage because the payload of the drone 114 is tightly controlled. In particular, the reservoir size of the drone 114 can be substantially reduced and the quantity of materials stored on board the drone 114 can be substantially reduced. Further, the drone 114 is selectively untethered from the rover 112 responsive to a determination (e.g., by the autonomous vehicle control system 122) that a distance the drone has to travel to de-ice the solar panel 304 is greater than a length of the hose. For example, in a scenario where there are multiple solar panels, if the rover 112 has limitations in reaching to a close proximity of a particular solar panel (e.g., the solar panel 304), then the distance the drone 114 needs to travel to reach the solar panel 304 may be greater than the length of the hose. In such examples, the drone 114 is detethered from the rover 112 (in particular, disconnected from the hose) to perform the spraying of the de-icing solution on the solar panel 304 and drone 114 is tethered back to the rover 112 (or the hose) once the spraying of the solar panel 304 is complete.

Alternately, in other examples, the drone 114 is untethered from the rover 112, when the drone 114 is deployed. In such examples, the drone 114 can include a relatively small reservoir for material (relative to the capacity of the reservoir on the rover 112). In this situation, the autonomous vehicle control system 122 can cause the drone 114 to dock with the rover 112 in the docking bay 116, refill the small reservoir with the de-icing solution (or other materials), and launch the drone 114 from the rover 112 (in an untethered condition) to distribute the de-icing solution (or other materials) to regions that would not be reachable if the drone 114 was tethered to the rover 112 with the hose. In this manner, the energy usage of the autonomous vehicle system 102 is curtailed because the payload of the drone 114 is tightly controlled, and the drone 114 can refill the small reservoir of the drone 114 while docked with the rover 112 in the docking bay 116.

In another example, when the problem includes management of batteries in the solar power plant/farm 302, the drone 114 is deployed to inspect the batteries with infrared imaging to detect overheating, and the rover 112 is deployed to concurrently inspect air quality to ensure that battery containers that store the batteries are not leaking gas. Other possible scenarios different from those listed above, where both the rover 112 and the drone 114 are deployed to resolve a problem associated the solar power plant/farm 302 are also contemplated to be within the scope of this description.

Figure 4:
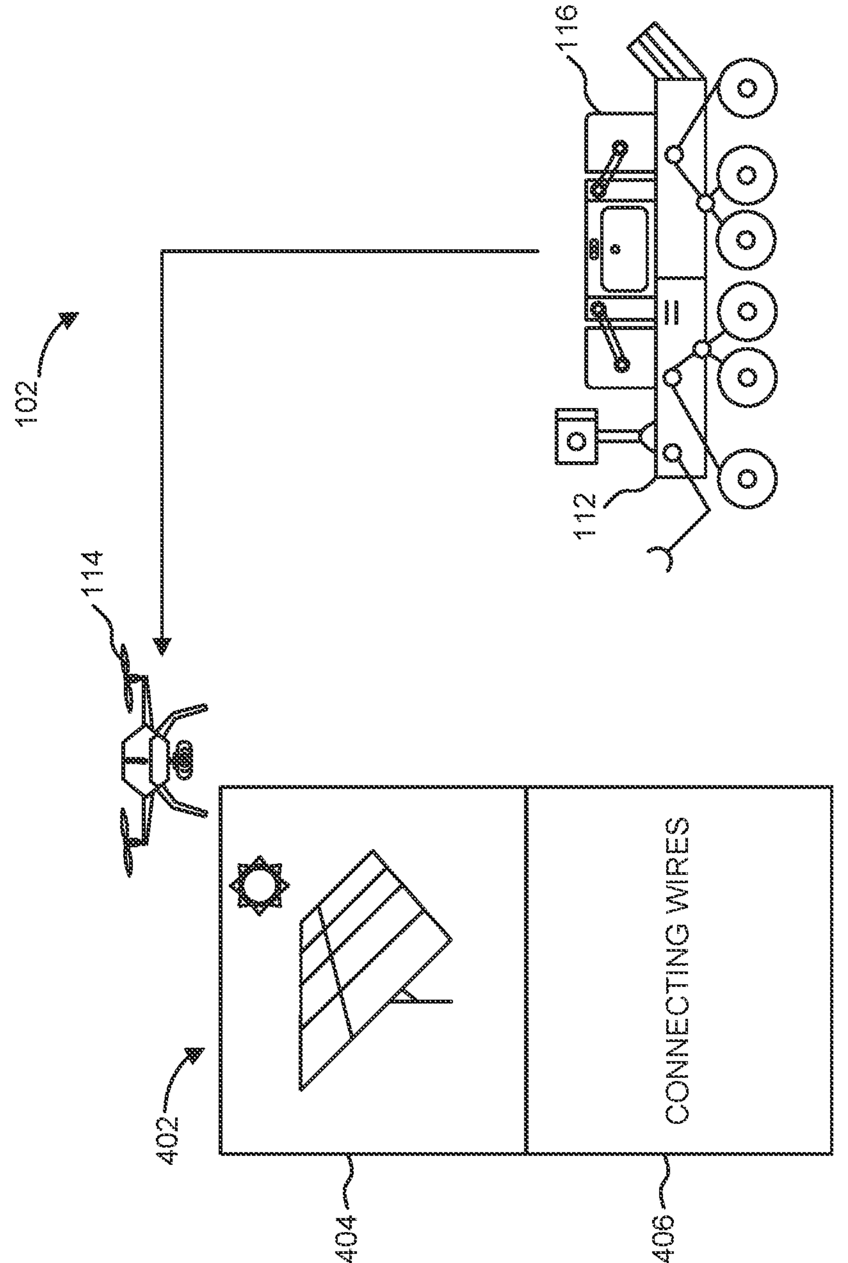
FIG. 4 illustrates yet another solution for resolving a problem in a solar power plant/farm using an autonomous vehicle system.

FIG. 4 illustrates yet another solution for resolving a problem in a solar power plant/farm 402 using an autonomous vehicle system 102. The solution described herein may include a solution as determined with respect to the system 100 in FIG. 1 and is therefore described herein with reference to the green energy generation system 108 in FIG. 1. The autonomous vehicle system 102 depicted in FIG. 4 is the same as the autonomous vehicle system 102 in FIG. 1, and therefore, the same numbering is used herein. The solution depicted herein may include a selected solution (e.g., a solution with a lowest energy consumption) to resolve a problem associated with a solar panel 404 in the solar power plant/farm 402. In this example, the solar power plant/farm 402 is shown to include only a single solar panel 404 for the ease of reference. However, in other examples, the solar power plant/farm 402 can include one or more solar panels. The solar power plant/farm 402 is part of the green energy generation system 108 in FIG. 1.

In this example, the solution includes launching the drone 114 from the docking bay 116 and deploying only the drone 114 to resolve the problem associated with the solar panel 404 or the solar power plant/farm 402. For example, if the problem includes some issues on a top side of the solar panel 204, the solution includes launching the drone 114 from the rover 112 and deploying the drone 114 to the top side of the solar panel 404 to work on the issues to resolve the problem. In this example, the rover 112 is not deployed. In some examples, the drone 114 is tethered to the rover 112 by a physical connection when the drone 114 is deployed. Further, the drone 114 is selectively untethered from the rover 112 responsive to a determination (e.g., by the autonomous vehicle control system 122 in FIG. 1) that a distance the drone 114 has to travel to resolve the problem is greater than a length of the physical connection. However, in other examples, the drone 114 is untethered from the rover 112 when the drone 114 is deployed.

Figure 5:
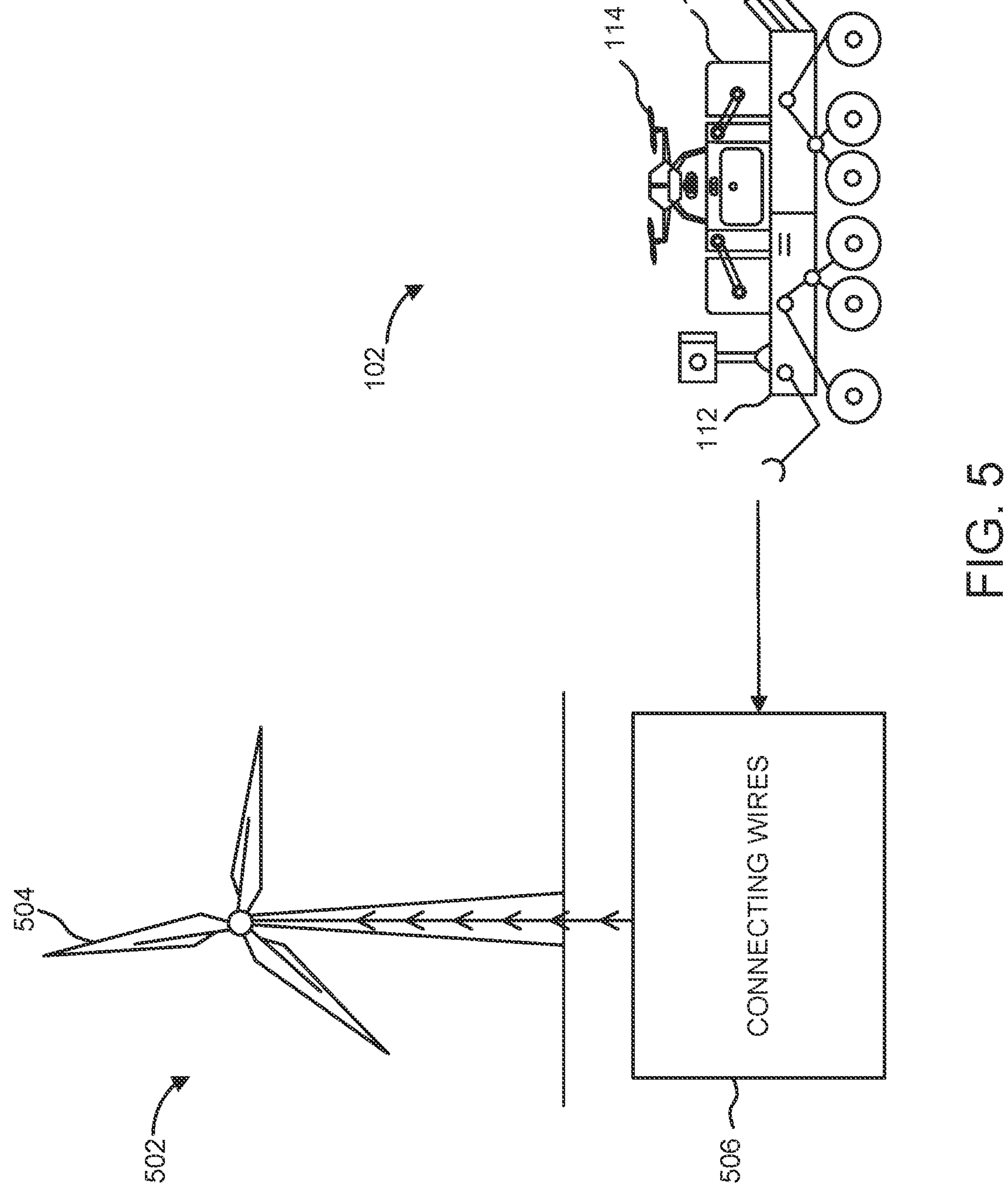
FIG. 5 illustrates a solution for resolving a problem in a wind power plant/farm using an autonomous vehicle system.

FIG. 5 illustrates a solution for resolving a problem in a wind power plant/farm 502 using an autonomous vehicle system 102. The solution described herein may include a solution as determined with respect to the system 100 in FIG. 1 and is therefore described herein with reference to the green energy generation system 108 in FIG. 1. The autonomous vehicle system 102 depicted in FIG. 5 is the same as the autonomous vehicle system 102 in FIG. 1, and therefore, the same numbering is used herein. The solution depicted herein may include a selected solution (e.g., a solution with a lowest energy consumption) to resolve a problem associated with a wind turbine 504 in the wind power plant/farm 502. In this example, the wind power plant/farm 502 is shown to include only a single wind turbine 504 for the ease of reference. However, in other examples, the wind power plant/farm 502 can include one or more wind turbines. The wind turbine 504 includes turbine blades and a tower. The wind power plant/farm 502 is part of the green energy generation system 108 in FIG. 1.

In this example, the solution includes deploying the rover 112 to resolve the problem associated with the wind turbine 504 and inhibiting a launch of the drone 114 from the docking bay 116. Therefore, in this example, the drone 114 is not deployed to resolve the problem. For example, if the problem includes a wiring problem associated with connective wires 506 of the wind turbine 504, the solution includes deploying the rover 112 (with the drone 114 in the docked position in the docking bay 116) to a base of the wind turbine 504 to work on the connective wires 506 (e.g., with actuators, such as robot hands), to resolve the problem. The rover 112 can be deployed to resolve other kinds of problems as well and is not limited to problems with the connective wires 506.

Figure 6:
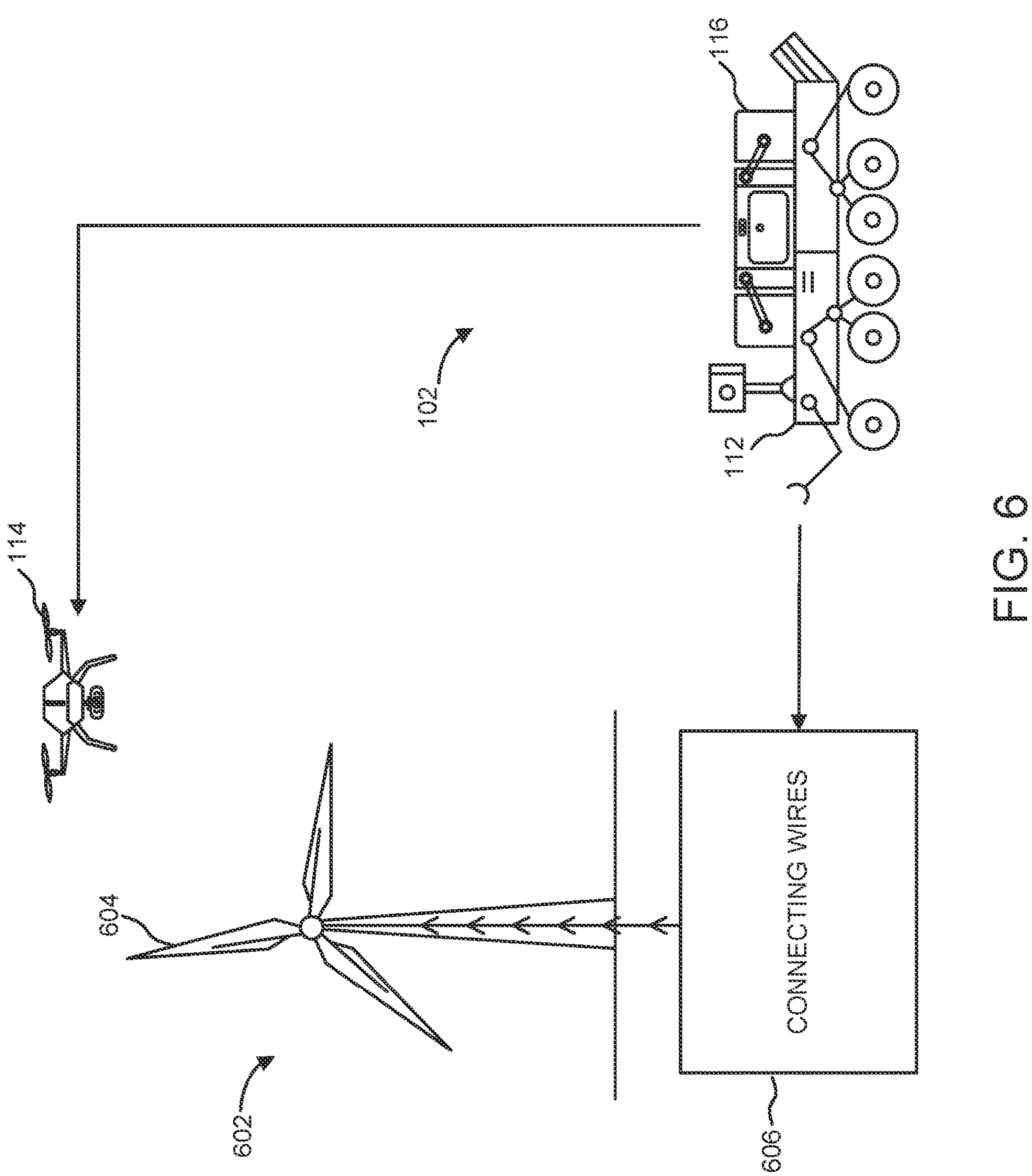
FIG. 6 illustrates another solution for resolving a problem in a wind power plant/farm using an autonomous vehicle system.

FIG. 6 illustrates another solution for resolving a problem in a wind power plant/farm 602 using an autonomous vehicle system 102. The solution described herein may include a solution as determined with respect to the system 100 in FIG. 1 and is therefore described herein with reference to the green energy generation system 108 in FIG. 1. The autonomous vehicle system 102 depicted in FIG. 6 is the same as the autonomous vehicle system 102 in FIG. 1, and therefore, the same numbering is used herein. The solution depicted herein may include a selected solution (e.g., a solution with a lowest energy consumption) to resolve a problem associated with a wind turbine 604 in the wind power plant/farm 602. In this example, the wind power plant/farm 602 is shown to include only a single wind turbine 604 for the ease of reference. However, in other examples, the wind power plant/farm 602 can include one or more wind turbines. The wind turbine 604 includes turbine blades and a tower. The wind power plant/farm 602 is part of the green energy generation system 108 in FIG. 1.

In this example, the solution includes launching the drone 114 from the docking bay 116 and deploying the rover 112 and drone 114 to resolve the problem associated with the wind turbine 604. The rover 112 is deployed for a first interval of time and the drone 114 is deployed for a second interval of time. In some examples, the first interval of time terminates prior to the second interval of time. Alternately, in other examples, the second interval of time terminates prior to the first interval of time. Further, in some examples, the first interval of time and the second interval of time overlap partially or fully. Furthermore, in some scenarios, the rover 112 and the drone 114 work in concert to resolve the problem. In some examples, the drone 114 is tethered to the rover 112 by a physical connection when the drone 114 is deployed to resolve the problem. During the deployment of the drone 114, in some examples, the drone 114 is selectively untethered from the rover 112 responsive to a determination that a distance the drone 114 has to travel to resolve the problem is greater than a length of the physical connection. Alternately, in other examples, the drone 114 is untethered from the rover 112 when the drone 114 is deployed to resolve the problem.

In one example, when the problem includes a wiring problem associated with connective wires 606 of the wind turbine 604 and some issues on a top side of the wind turbine 604, the solution includes deploying the rover 112 to the base of the wind turbine 604 to work on the connective wires 606 and deploying the drone 114 to the top of the wind turbine 604 to resolve the issues/problems associated with the top of the wind turbine 604. In another example, when the problem includes de-icing the wind turbine 604, the solution includes deploying the rover 112 to act as a reservoir to store the de-icing solution and pump the de-icing solution to the drone 114 and deploying the drone 114 to spray the de-icing solution on the wind turbine 604 (e.g., the turbine blades).

In some examples, the drone 114 is tethered to the rover 112 by a hose (e.g., a physical connection) when the drone 114 is deployed to spray the de-icing solution and the rover 112 is configured to pump the de-icing solution to the drone 114 through the hose. The rover 112 may have a large reservoir for storing the de-icing solution (or other materials) compared to the drone 114. Transferring the de-icing solution (or other materials) to the drone 114 in this manner curtails energy usage because the payload of the drone 114 is tightly controlled. In particular, the reservoir size of the drone 114 can be substantially reduced and the quantity of materials stored on board the drone 114 can be substantially reduced. Further, the drone 114 is selectively untethered from the rover 112 responsive to a determination (e.g., by the autonomous vehicle control system 122) that a distance the drone has to travel to de-ice the wind turbine 604 is greater than a length of the hose. For example, if the distance the drone 114 needs to travel to reach the turbine blades of the wind turbine 604 is greater than the length of the hose, the drone 114 is detethered from the rover 112 (in particular, disconnected from the hose) to perform the spraying of the de-icing solution on the wind turbine 604 and drone 114 is tethered back to the rover 112 (or the hose) once the spraying of the wind turbine 604 is complete.

Alternately, in other examples, the drone 114 is untethered from the rover 112, when the drone 114 is deployed. In such examples, the drone 114 can include a relatively small reservoir for material (relative to the capacity of the reservoir on the rover 112). In this situation, the autonomous vehicle control system 122 can cause the drone 114 to dock with the rover 112 in the docking bay 116, refill the small reservoir with the de-icing solution (or other materials), and launch the drone 114 from the rover 112 (in an untethered condition) to distribute the de-icing solution (or other materials) to regions that would not be reachable if the drone 114 was tethered to the rover 112 with the hose. In this manner, once again, the energy usage of the autonomous vehicle system 102 is curtailed because the payload of the drone 114 is tightly controlled, and the drone 114 can refill the drone's small reservoir while docked with the rover 112 in the docking bay 116.

In another example, when the problem includes management of batteries in the wind power plant/farm 602, the drone 114 is deployed to inspect the batteries with infrared imaging to detect overheating, and the rover 112 is deployed to concurrently inspect air quality to ensure that battery containers that store the batteries are not leaking gas. Other possible scenarios different from those listed above, where both the rover 112 and the drone 114 are deployed to resolve a problem associated the wind power plant/farm 602 are also contemplated to be within the scope of this description.

Figure 7:
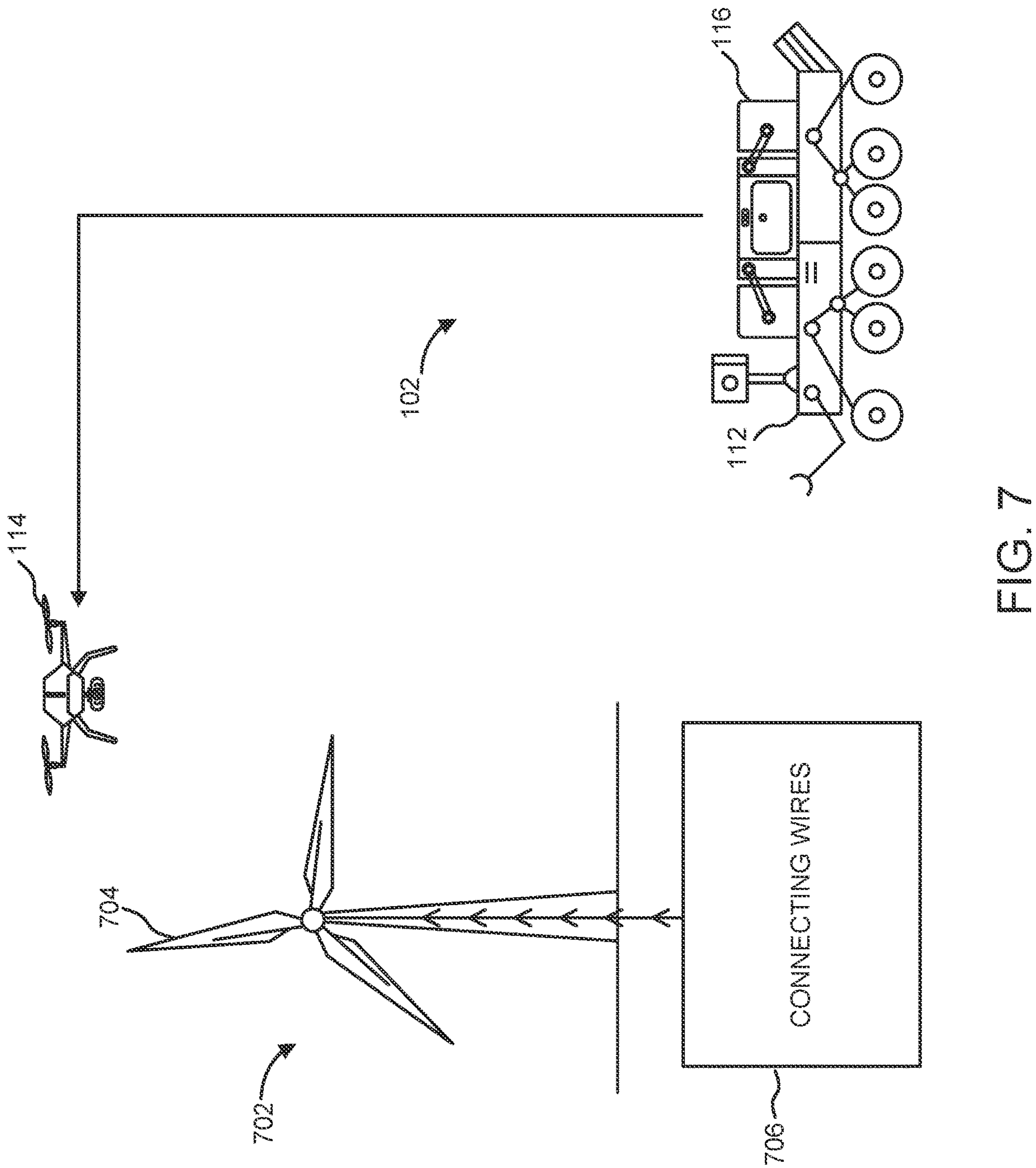
FIG. 7 illustrates yet another solution for resolving a problem in a wind power plant/farm using an autonomous vehicle system.

FIG. 7 illustrates yet another solution for resolving a problem in a wind power plant/farm 702 using an autonomous vehicle system 102. The solution described herein may include a solution as determined with respect to the system 100 in FIG. 1 and is therefore described herein with reference to the green energy generation system 108 in FIG. 1. The autonomous vehicle system 102 depicted in FIG. 7 is the same as the autonomous vehicle system 102 in FIG. 1, and therefore, the same numbering is used herein. The solution depicted herein may include a selected solution (i.e., a solution with a lowest energy consumption) to resolve a problem associated with a wind turbine 704 in the wind power plant/farm 702. In this example, the wind power plant/farm 702 is shown to include only a single wind turbine 704 for the ease of reference. However, in other examples, the wind power plant/farm 702 can include one or more wind turbines. The wind turbine 704 includes turbine blades and a tower. The wind power plant/farm 702 is part of the green energy generation system 108 in FIG. 1.

In this example, the solution includes launching the drone 114 from the docking bay 116 and deploying only the drone 114 to resolve the problem associated with the wind turbine 704 or the wind power plant/farm 702. For example, if the problem includes some issues on the top of the wind turbine 704, the solution includes launching the drone 114 from the rover 112 and deploying the drone 114 to the top of the wind turbine 704 to work on the issues to resolve the problem. In this example, the rover 112 is not deployed. In some examples, the drone 114 is tethered to the rover 112 by a physical connection when the drone 114 is deployed. Further, the drone 114 is selectively untethered from the rover 112 responsive to a determination (e.g., by the autonomous vehicle control system 122 in FIG. 1) that a distance the drone 114 has to travel to resolve the problem is greater than a length of the physical connection. However, in other examples, the drone 114 is untethered from the rover 112 when the drone 114 is deployed.

Figure 8:
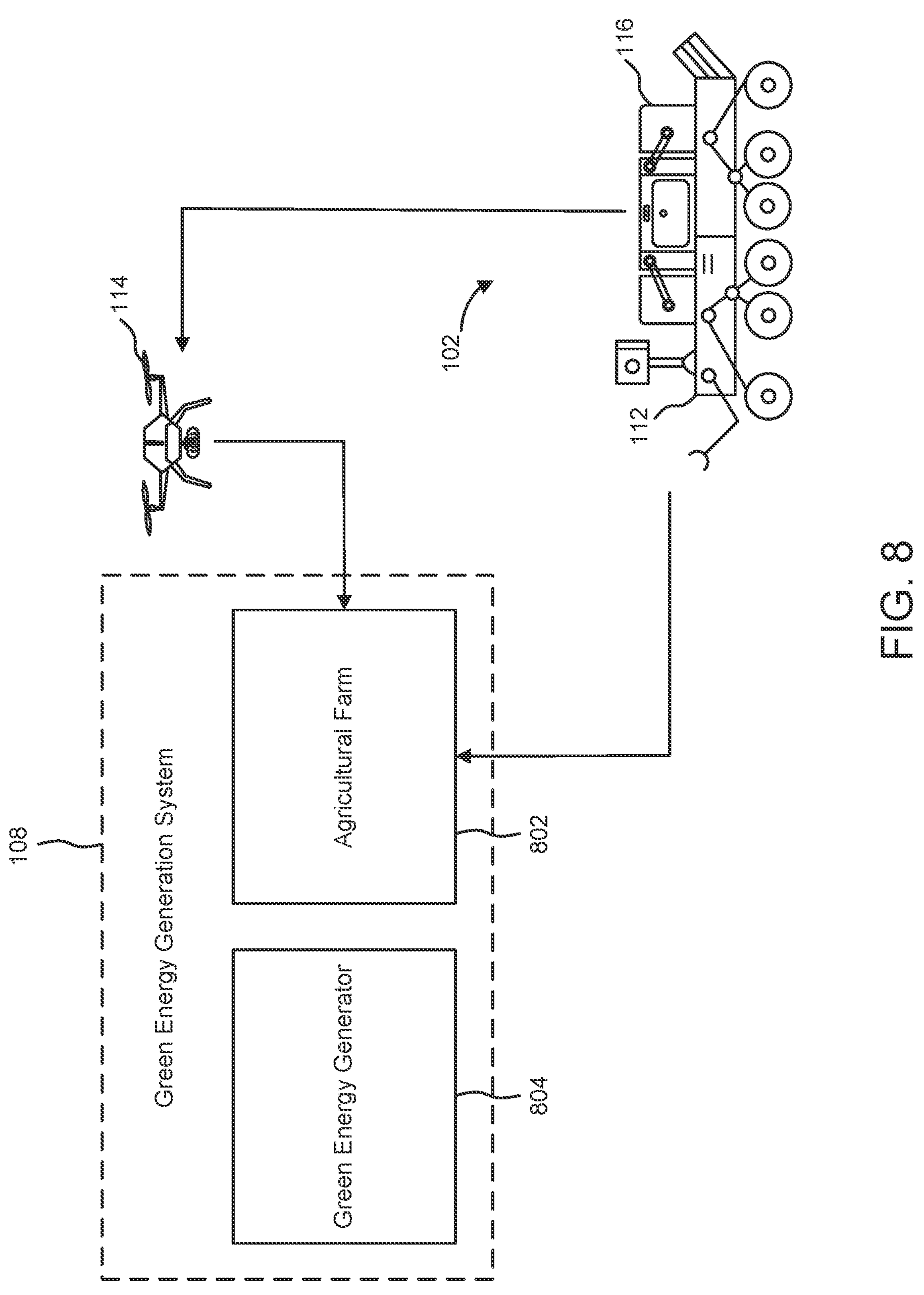
FIG. 8 illustrates one or more solutions for resolving a problem in a wind power plant/farm using an autonomous vehicle system.

FIG. 8 illustrates one or more solutions for resolving a problem in an agricultural farm 802 adjacent to a green energy generator 804 using an autonomous vehicle system 102. The green energy generator 804 may include a solar panel/farm, a wind turbine/farm etc. The solutions described herein may include one or more solutions as determined with respect to the system 100 in FIG. 1 and is therefore described herein with reference to the green energy generation system 108 in FIG. 1. The agricultural farm 802 and the green energy generator 804 may be part of the green energy generation system 108 in FIG. 1 and therefore, the same numbering is used herein. The autonomous vehicle system 102 depicted in FIG. 8 is the same as the autonomous vehicle system 102 in FIG. 1, and therefore, the same numbering is used herein. The solution depicted herein may include a selected solution (i.e., a solution with a lowest energy consumption) to resolve a problem associated with the agricultural farm 802.

In this example, the solution includes launching the drone 114 from the docking bay 116 and deploying the rover 112 and drone 114 to resolve the problem associated with the agricultural farm 802. The rover 112 is deployed for a first interval of time and the drone 114 is deployed for a second interval of time. In some examples, the first interval of time terminates prior to the second interval of time. Alternately, in other examples, the second interval of time terminates prior to the first interval of time. Further, in some examples, the first interval of time and the second interval of time overlap partially or fully. Furthermore, in some scenarios, the rover 112 and the drone 114 work in concert to resolve the problem. In some examples, the drone 114 is tethered to the rover 112 by a physical connection when the drone 114 is deployed to resolve the problem. During the deployment of the drone 114, in some examples, the drone 114 is selectively untethered from the rover 112 responsive to a determination that a distance the drone 114 has to travel to resolve the problem is greater than a length of the physical connection. Upon resolving the problem, the drove 114 is tethered back to the rover 112 via the physical connection. Alternately, in other examples, the drone 114 is untethered from the rover 112 when the drone 114 is deployed to resolve the problem.

In one example, if the problem includes tilling and seeding the agricultural farm 802, the solution includes deploying the drone 114 for seeding and deploying the rover 112 to till regions of the agricultural farm 802 contemporaneously with the seeding by the drone 114. The drone 114 may be configured to communicate with the rover 112 as to where the rover 112 can till the agricultural farm 802. In some examples, the drone 114 is tethered to the rover 112 by a hose (e.g., a physical connection) when the drone 114 is deployed for seeding and the rover 112 is configured to pump/provide the seeds to the drone 114 through the hose. The rover 112 may have a large reservoir for storing the seeds (or other materials) compared to the drone 114. Transferring the seeds to the drone 114 in this manner curtails energy usage because the payload of the drone 114 is tightly controlled. In particular, the reservoir size of the drone 114 can be substantially reduced and the quantity of seeds stored on board the drone 114 can be substantially reduced.

Alternately, in other examples, the drone 114 is untethered from the rover 112, when the drone 114 is deployed. In such examples, the drone 114 can include a relatively small reservoir for material (relative to the capacity of the reservoir on the rover 112). In this situation, the autonomous vehicle control system 122 can cause the drone 114 to dock with the rover 112 in the docking bay 116, refill the small reservoir with the seeds (or other materials), and launch from the rover 112 (in an untethered condition) to distribute the seeds (or other materials) to regions that would not be reachable if the drone 114 was tethered to the rover 112 with the hose. In this manner, once again, the energy usage of the autonomous vehicle system 102 is curtailed because the payload of the drone 114 is tightly controlled, and the drone 114 can refill the drone's small reservoir while docked with the rover 112 in the docking bay 116.

Further, in another example, if the problem includes monitoring for pests/wildlife in the agricultural farm 802, the solution includes deploying the drone 114 to identify the location of the pests/wildlife and deploying the rover 112 to act as a deterrent through noise and/or vibration disturbance. Further, other scenarios/problems different from above can be addressed by deploying the drone 114 and the rover 112. Furthermore, in another example, the solution may include deploying the rover 112 to resolve the problem associated with the agricultural farm 802 and inhibiting a launch of the drone 114 from the docking bay 116. Further, in another example, the solution may include launching the drone 114 from the docking bay 116 and deploying only the drone 114 to resolve the problem associated with the agricultural farm 802.

Figure 9:
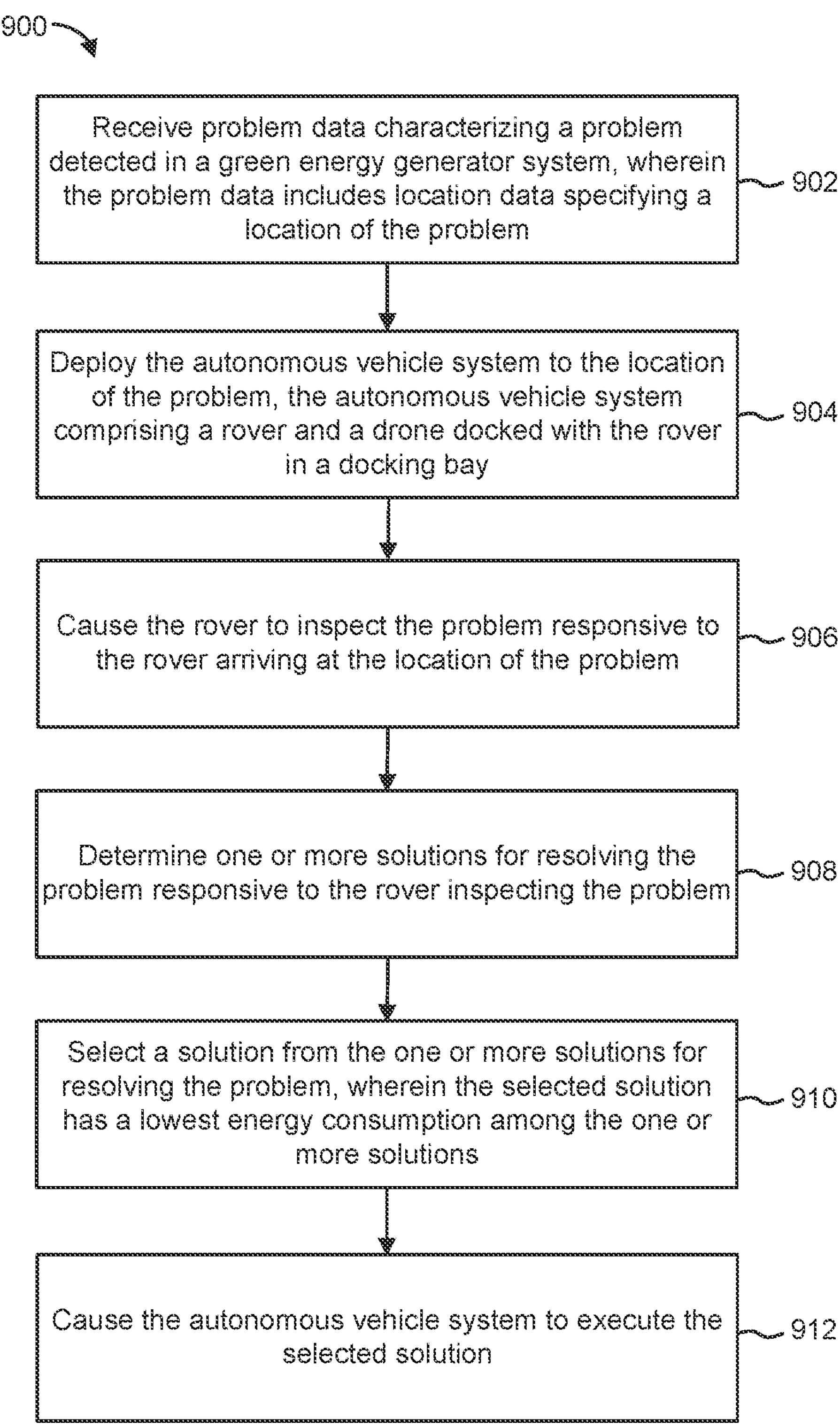
FIG. 9 illustrates a flow chart of a method for an autonomous vehicle control system for an autonomous vehicle system.

In view of the foregoing structural and functional features described above, an example method will be better appreciated with reference to FIG. 9. While, for purposes of simplicity of explanation, the example method of FIG. 9 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 9 illustrates a flow chart of a method 900 for an autonomous vehicle control system for an autonomous vehicle system. The method is explained with reference to the system 100 in FIG. 1. At 902, problem data characterizing a problem detected in a green energy generator system (e.g., the green energy generation system 108 in FIG. 1) is received by an autonomous vehicle control system (e.g., the autonomous vehicle control system 122 in FIG. 1). The problem data includes location data that specifies a location of the problem. At 904, an autonomous vehicle system (e.g., the autonomous vehicle system 102 in FIG. 1) is deployed to the location of the problem, the autonomous vehicle system including a rover (e.g., the rover 112 in FIG. 1) and a drone (e.g., the drone 114 in FIG. 1) docked with the rover in a docking bay (e.g., the docking bay 116 in FIG. 1).

At 906, the autonomous vehicle control system causes the rover to inspect the problem responsive to the rover arriving at the location of the problem. At 908, one or more solutions for resolving the problem is determined by the autonomous vehicle control system responsive to the rover inspecting the problem. At 910, a solution is selected by the autonomous vehicle control system from the one or more solutions for resolving the problem. In some examples, the selected solution has a lowest energy consumption among the one or more solutions. At 912, the autonomous vehicle control system causes the autonomous vehicle system to execute the selected solution.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in a non-transitory machine readable medium), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processors of a general purpose computer, special purpose computer, or other programmable data processing apparatus (or a combination of devices and circuits) to produce a machine, such that the instructions, which execute via the one or more processors, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

What have been described above are examples. It is, of course, not possible to describe every conceivable combination of structures, components, or methods, but one of ordinary skill in the art will recognize that many further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory computer readable medium having stored software instructions for an autonomous vehicle control system of an autonomous vehicle system that, when executed by a processor, cause the processor to:

receive problem data characterizing a problem detected in a green energy generation system, wherein the problem data includes location data specifying a location of the problem;

deploy the autonomous vehicle system to the location of the problem, the autonomous vehicle system comprising:

a rover having a sensor for collecting inspection data; and a drone docked with the rover in a docking bay;

cause the rover to collect the inspection data characterizing an inspection of the problem in response to the rover arriving at the location of the problem;

determine solutions for resolving the problem based on the inspection data, wherein the solutions include a rover solution that includes deploying the rover and inhibiting deployment of the drone and a drone solution that includes deploying the drone;

select a solution from the solutions for resolving the problem, wherein the selected solution has a lowest energy consumption by a vehicle of the autonomous vehicle system associated with the selected solution among the solutions for resolving the problem; and cause the autonomous vehicle system to deploy the vehicle that is associated with the selected solution.

2. The non-transitory computer readable medium of claim 1, wherein the rover solution comprises deploying the rover to resolve the problem and inhibiting the deployment of the drone includes preventing a launch of the drone from the docking bay.

3. The non-transitory computer readable medium of claim 2, wherein the green energy generation system comprises a solar panel, and the selected solution comprises deploying the rover to an underside of the solar panel; or the green energy generation system comprises a wind turbine, and the selected solution comprises deploying the rover to a base of the wind turbine.

4. The non-transitory computer readable medium of claim 1, wherein the drone solution comprises launching the drone from the docking bay and deploying the drone to resolve the problem.

5. The non-transitory computer readable medium of claim 1, wherein the solutions include a hybrid solution that includes sequentially implementing the solutions, and wherein the rover is deployed for a first interval of time, and the drone is deployed for a second interval of time, wherein the first interval of time terminates prior to a start of the second interval of time.

6. The non-transitory computer readable medium of claim 5, wherein the green energy generation system comprises a solar panel, and the hybrid solution comprises deploying the rover to an underside of the solar panel and deploying the drone to a top side of the solar panel.

7. The non-transitory computer readable medium of claim 5, wherein the green energy generation system comprises a wind turbine, and the hybrid solution comprises deploying the rover to a base of the wind turbine and deploying the drone to a top of the wind turbine.

8. The non-transitory computer readable medium of claim 5, wherein the green energy generation system comprises an agricultural farm adjacent to a green energy generator, and the hybrid solution comprises deploying the drone for seeding and deploying the rover to till regions of the agricultural farm contemporaneously with the seeding by the drone.

9. The non-transitory computer readable medium of claim 1, wherein the drone is tethered to the rover by a physical connection.

10. The non-transitory computer readable medium of claim 9, wherein materials are transferred from the rover to the drone through the physical connection, in response to deployment of the drone to resolve the problem.

11. The non-transitory computer readable medium of claim 9, wherein the drone is untethered from the rover responsive to a determination that a distance the drone has to travel to resolve the problem is greater than a length of the physical connection.

12. The non-transitory computer readable medium of claim 1, wherein the problem data characterizes a first problem and a second problem detected in the green energy generation system, and wherein the autonomous vehicle control system cause the processor to cause the autonomous vehicle system to execute a first solution for resolving the first problem and a second solution for resolving the second problem in a sequence based on assessing a battery capacity of the autonomous vehicle system, wherein the first solution comprises the selected solution having the lowest energy consumption for resolving the first problem and the second solution comprises the selected solution having the lowest energy consumption for resolving the second problem.

13. The non-transitory computer readable medium of claim 12, wherein the autonomous vehicle control system causes the processor to:
- determine the first solution;
- cause the autonomous vehicle system to execute the first solution responsive to a determination that the battery capacity is adequate to execute the first solution;
- deploy the autonomous vehicle system to the location of the second problem;
- determine the second solution; and
- cause the autonomous vehicle system to execute the second solution responsive to a determination that the battery capacity is adequate to execute the second solution.

14. The non-transitory computer readable medium of claim 12, wherein the autonomous vehicle control system causes the processor to:
- determine the first solution;
- cause the autonomous vehicle system to execute the first solution responsive to a determination that the battery capacity is adequate to execute the first solution;
- deploy the autonomous vehicle system to the location of the second problem;
- determine the second solution; and
- cause the autonomous vehicle system to recharge responsive to a determination that the battery capacity is inadequate to execute the second solution; and
- re-deploy the autonomous vehicle system to resolve the second solution.

15. The non-transitory computer readable medium of claim 12, wherein the autonomous vehicle control system causes the processor to:
- determine the first solution;
- deploy the autonomous vehicle system to a location of the second problem responsive to a determination that the battery capacity is inadequate to execute the first solution;
- determine the second solution;
- cause the autonomous vehicle system to execute the second solution responsive to a determination that the battery capacity is adequate to execute the second solution;
- cause the autonomous vehicle system to recharge; and
- re-deploy the autonomous vehicle system to execute the first solution.

16. The non-transitory computer readable medium of claim 1, wherein the rover solution includes deploying the rover to fix the green energy generation system at the location and the drone solution includes deploying the drone to fix the green energy generation system at the location.

17. A system for an autonomous vehicle system, comprising:
- a non-transitory memory having machine executable instructions; and
- a processor core that accesses the memory and executes the machine executable instructions, the machine executable instructions comprising an autonomous vehicle control system for the autonomous vehicle system, the autonomous vehicle control system causing the processor core to execute operations comprising;
  - receiving problem data characterizing a problem detected in a green energy generator, wherein the problem data includes location data specifying a location of the problem;
  - deploying the autonomous vehicle system to the location of the problem, the autonomous vehicle system comprising:
    - a rover having a sensor for collecting inspection data; and
    - a drone docked with the rover in a docking bay;
  - causing the rover to inspect the problem to collect the inspection data in response to the rover arriving at the location of the problem;
  - determining solutions for resolving the problem based on the inspection data, wherein the solutions include at least one rover solution that includes deploying the rover and inhibiting deployment of the drone and at least one drone solution that includes deploying the drone;
  - selecting a solution from the solutions for resolving the problem, wherein the selected solution has a lowest energy consumption by a vehicle of the autonomous vehicle system associated with the selected solution among the solutions; and
  - causing the autonomous vehicle system to deploy the vehicle that is associated with the selected solution.

18. The system of claim 17, wherein the selected solution comprises deploying the rover to resolve the problem and inhibiting the deployment of the drone includes preventing a launch of the drone from the docking bay.

19. A method for an autonomous vehicle control system for an autonomous vehicle system, the method comprising:
- receiving, by the autonomous vehicle control system operating on a computing platform, problem data characterizing a problem detected in a green energy generator system, wherein the problem data includes location data specifying a location of the problem;

deploying, by the autonomous vehicle control system, the autonomous vehicle system to the location of the problem, the autonomous vehicle system comprising:

a rover having a sensor for collecting inspection data; and a drone docked with the rover in a docking bay;

causing, by autonomous vehicle control system, the rover to inspect the problem to collect the inspection data in response to the rover arriving at the location of the problem;

determining, by the autonomous vehicle control system, solutions for resolving the problem based on the inspection data, wherein the solutions include at least one rover solution that includes deploying the rover and inhibiting deployment of the drone and at least one drone solution that includes deploying the drone;

selecting, by the autonomous vehicle control system, a solution from the solutions for resolving the problem, wherein the selected solution has a lowest energy consumption by a vehicle of the autonomous vehicle system associated with the selected solution among the solutions; and causing, by the autonomous vehicle control system, the autonomous vehicle system to deploy the vehicle that is associated with the selected solution.

20. The method of claim 19, wherein the problem data characterizing the problem detected in the green energy generator system is received from a supervisory control and data acquisition (SCADA) system.

* * * * *